INVENTOR.
FRITZ OSTWALD
BY
Karl F. Ross
ATTORNEY

United States Patent Office 3,439,781
Patented Apr. 22, 1969

3,439,781
SELF-ADJUSTING BRAKE MECHANISM
Fritz Ostwald, Buchschlag, Germany, assignor to Alfred Teves Maschinen- und Armaturenfabrik KG, Frankfurt am Main, Germany, a corporation of Germany
Filed July 18, 1967, Ser. No. 654,198
Claims priority, application Germany, July 21, 1966, T 31,639
Int. Cl. F16d 65/38, 55/00, 51/00
U.S. Cl. 188—196                                    10 Claims

ABSTRACT OF THE DISCLOSURE

A hydraulic wheel brake for an automotive vehicle in which the cylinder and piston are provided with mutually telescoping members forming a clearance therebetween in which a spiral spring is received; the spiral spring has turns of large and small diameter engaging the inner and outer members and frictionally bearing radially one of them while being received in a groove of the other for sliding the frictional turn along the respective member to re-position the piston when the brake play exceeds a predetermined level.

---

My present invention relates to a self-adjusting brake mechanism of the type which is designed to compensate wear of the brake lining and to maintain a substantially constant brake play.

It has been proposed heretofore to provide disk-brake assemblies and drum-type brakes with self-adjusting mechanism adapted to advance the rest position of a brakeshoe relative to the brake actuating means in order to compensate for wear of the brake lining and maintain brake efficiency. Thus, for example, "internal-expanding" brakes or "drum-type" brakes generally have a pair of brakeshoes conforming to a cylindrical segment and urged outwardly against the inner cylindrical surface of a brake drum by one or more wheel-brake cylinders energized with fluid pressure by the brake master cylinder upon depression of the brake pedal. As the brake lining tends to wear, the stroke of the piston of this wheel-brake cylinder increases for a given degree of braking effectiveness with correspondingly increasing fluid demands on the master cylinder and a corresponding increase in the stroke of the master cylinder piston and the brake pedal. The unevenness and nonuniformity of the braking effectiveness is a safety hazard and, since the master cylinder normally operates a number of wheel brakes, may result in uneven application of the brakes and differences in brake wear on further use. The same considerations hold true in disk-brake assemblies in which a rotatable disk is coupled with the vehicle wheel and is rotatable therewith while a brake yoke is mounted upon a relatively fixed portion of the vehicle, e.g., the chassis or axle housing, and extends around the periphery of the brake disk while receiving a pair of brake linings adapted to be urged axially against the disk. In some cases, this yoke is provided with a pair of wheel-brake cylinders whose pistons are energized in parallel by the source of hydraulic fluid or individually by respective fluid-transmission networks to urge respective brakeshoes against the disk. In other arrangements, the yoke is axially shiftable relatively to the disk and only a single wheel-brake cylinder is provided therein. In this latter arrangement, the piston urges one brakeshoe directly against the disk while the reaction force upon the cylinder is transmitted by the yoke to the brakeshoe on the opposite side of the disk which is substantially simultaneously applied. In yet another disk-brake arrangement, a single wheel-brake cylinder may be provided in an axially fixed yoke while the disk has limited freedom of axial movement although rotatably entrained by the wheel. Consequently, the piston urges one brakeshoe directly against the disk and the disk is brought thereby into contact with the other brakeshoe. In all of these systems, a wheel-brake cylinder is provided with a piston which is displaced by the brake fluid in the direction of the braking face of a rotatable member and urges a brakeshoe thereagainst. Prior-art assemblies for adjusting the rest position of this piston relatively to the wheel-brake cylinder in which it is slidably received have hitherto involved the use of relatively complex pawl-and-ratchet assemblies, spindles interconnecting the cylinder and the piston, or friction disks forming a lost-motion coupling with the piston and drawn along thereby upon excessive movement of the piston consistent with a brake play beyond the predetermined maximum level. All of these systems, aside from their complexity, had the disadvantage that they were relatively expensive, required skilled workmanship for installation and assembly and were prone to failure because of contamination and wear.

Accordingly, it is an important object of the present invention to provide, in a brake system of the character described, an improved self-adjusting mechanism whereby the aforementioned disadvantages are avoided.

This object and others which will become apparent hereinafter, are attained, in accordance with the present invention, by providing, between the piston and the cylinder of a brake system of the aforedescribed character, a friction-spring means having at least two turns and bearing radially against peripheries of telescopingly interfitted portions of the piston-and-cylinder members, one of these turns being anchored to one of the telescoped members while the other is frictionally engaged with a peripheral surface of the other member and can be drawn along the latter upon relative axial displacement of the piston and the cylinder beyond a predetermined extent. The coil spring thus may have a relatively large-diameter turn received within the groove formed along an inner wall of the cylindrical recess of the piston into which a boss of the cylinder extends, the relatively small-diameter turn of the spiral engaging this boss. Of course, the kinematic reversal of this arrangement, whereby a cylindrical projection of the piston forms a male member received with clearance in a socket of the cylinder and carries the axially fixed winding of the spring spiral, is also included within the concept of this invention. Advantageously, the spiral spring of this invention has a rectangular cross-section and is so constructed that the larger face of the rectangle extends radially with respect to the axis of the spiral. The spring may, however, have a triangular or circular section.

The above and other objects, features and advantages of the present invention will become more readily apparent from the following description, reference being made to the accompanying drawing in which:

FIG. 1 is an axial cross-sectional view through a wheel-brake cylinder of a disk brake embodying the invention;

FIG. 2 is a perspective view of the coil spring thereof;

Figure 3:
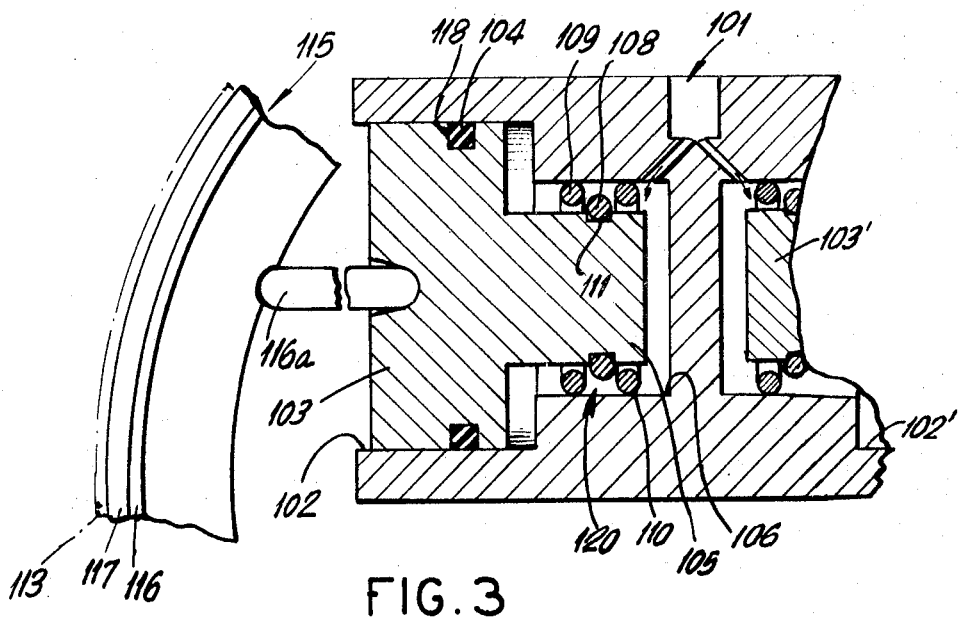
FIG. 3 is a view similar to FIG. 1 of another embodiment of the invention.

In FIG. 1, I show, in fragmentary form, a disk-brake arrangement wherein a yoke 1 has a pair of lobes disposed on opposite sides of a brake disk 13 coupled with the wheel of an automotive vehicle, the yoke 1 being affixed to the axle housing thereof. The overall disk-brake construction may be of the type illustrated in the commonly assigned copending applications Ser. No. 618,058 filed Feb. 23, 1962 and Ser. No. 642,398 filed May 31, 1967. The wheel-brake cylinder is here shown at 2 to be formed in the yoke 1 which has a passage 14 supplied with hydraulic brake fluid from the master cylinder of the vehicle, the latter being actuated by a brake pedal in the usual manner. The cylinder bore 2 slidably receives a piston 3 which, when hydraulic fluid is forced into the chamber 12 behind the piston 3, is urged in the direction of arrow A and presses a brakeshoe 15 against the disk. The brakeshoe 15 comprises a backing plate 16 abutting the piston 3 and guided in the yoke 1 and a lining 17 of wear-resistant material having a high friction coefficient confronting the disk 13. An annular seal 4 is provided in a groove 18 of the piston 3 and slidably engages the wall of bore 2 to prevent escape of fluid from chamber 12.

As can be seen from FIG. 1, the floor of cylinder 2 is provided with a cylindrical boss 5 which is received with clearance in a cylindrical recess 6 of the piston 3, the portions 5 and 6 forming telescopingly interfitted members in accordance with the principles of this invention. The cylindrical recess 6 is provided with an inwardly open peripheral groove 11 of rectangular cross-section which receives the two axially outermost and relatively large-diameter turns 9 and 10 of a coil spring generally designated 20 and shown in a perspective view in FIG. 2. The inner, relatively small-diameter turn 8 of this spring 20 frictionally bears against the cylindrical boss 5 and can be drawn axially therealong only when the axial force in the direction of arrow A exceeds the resisting force of friction. As illustrated in FIG. 1, the turns 8–10 of spring 20, which bears resiliently and radially upon the boss 5 at its inner turn 8, are of rectangular cross-section with the broader faces 21, 22 etc. extending generally radially with respect to the axis X of the spring. Furthermore, the outer turns 9 and 10 project radially inwardly by a distance R sufficient to enable them to engage the inner turn 8 upon axial movement of the piston 3 through a distance D, constituting the predetermined brake play.

In normal brake operation (assuming no prior wear of the brake lining 17), hydraulic fluid is supplied through passage 14 to chamber 12 and urges the piston 3 in the direction of arrow A to bring the brakeshoe 15 into engagement with the disk 13. The latter is thus slowed and finally stopped with respect to its rotary movement relative to the yoke 1. Upon release of he brake pedal, the spring 20 tends to re-establish its original position as illustrated in FIG. 1 although the outer turns 9 and 10 have shifted slightly to the left. This operative mode continues until the normal brake play D is exceeded because of wear of the brake lining 17. When this occurs, the next advance of the piston 3 to the left will cause the rearmost turn 10 to engage the inner turn 8 prior to the application of brakeshoe 15 to the disk 13. Furthermore, movement of the piston 3 to the left to bring shoe 15 into engagement with the disk will entrain the inner turn 8 with a force exceeding the friction force along the boss 5 by a corresponding distance.

When the brake is released, the distance D between turns 8 and 10 is re-established by virtue of the resilient characteristics of the spring, the inner turn 8 being then frictionally anchored to the boss 5. While only a single spring has been shown in FIGS. 1 and 2, it will be understood that a number of springs of this type may be axially disposed along the boss 5 and recess 6 with, of course, the corresponding turns anchored in one of the mutually interfitting members. Alternatively, the spring 20 may have several inner turns of relatively small diameter alternating with the large-diameter turns. Also, the assembly of the device is faciiltated by comparison with prior systems since, once the spring 20 is mounted in the grooves 11, the piston need merely be thrust axially into the bore 2 (to the right) to position the device properly for use without further action.

Figure 4:
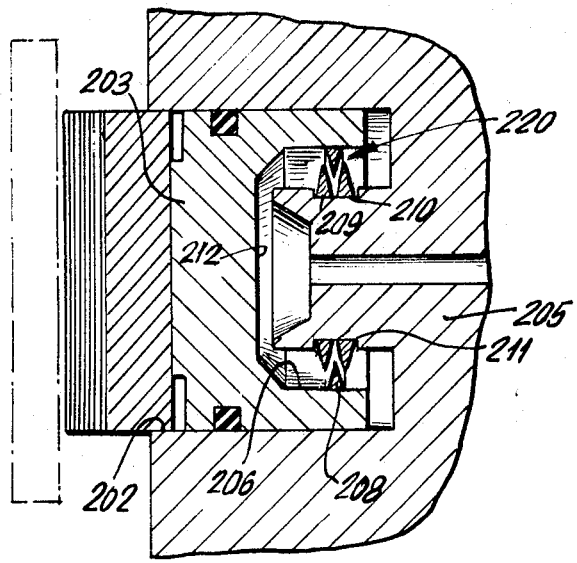
FIG. 4 is an axial cross-sectional view through a wheel-brake cylinder of yet a further embodiment.
Figure 3:
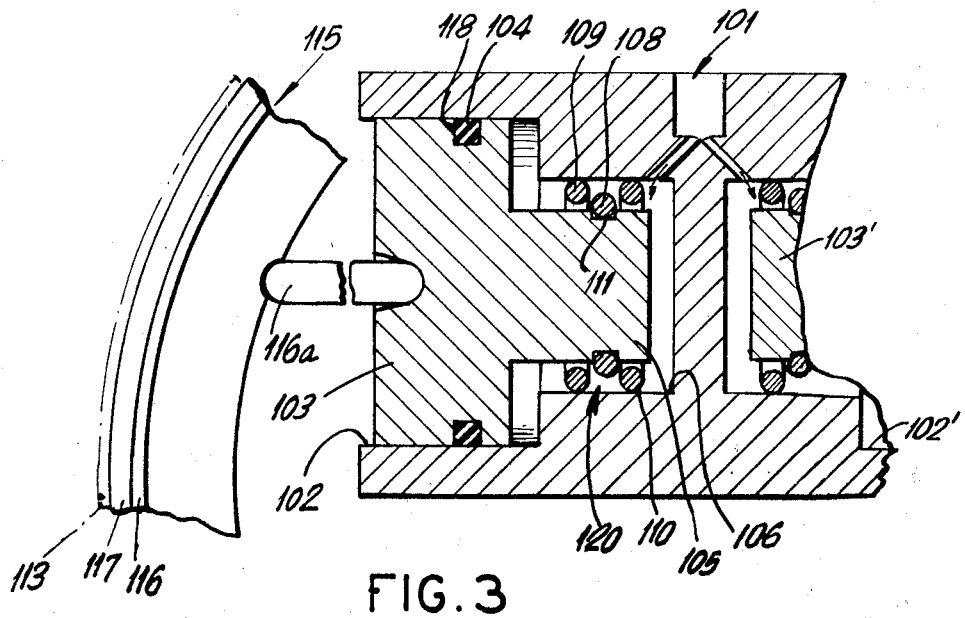
Figure 4:
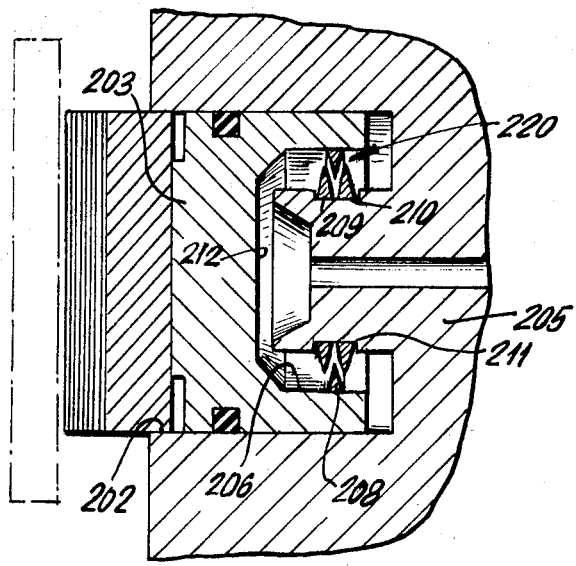

In FIGS. 3 and 4, I show modified systems employing the principles of this invention. For example, the wheel-brake cylinder 101 of FIG. 3 is provided with a pair of cylinder bores 102 and 102' whose pistons 103 and 103' are designed to urge respective brakeshoes 115 (only one shown) against the inner surface of a brake drum represented at 113. Here, the brakeshoes are of the internal-expanding type and comprise cylindrical segmental backing plates 116 which are connected within respective pistons 103 etc. by force-transmitting links 116a, and correspondingly shaped brake linings 117 carried by the plates 116. Each piston 103 etc. is provided with a peripheral recess 118 receiving an annular seal 104 in all-around engagement with the cylinder bore 102. In this embodiment, which represents a reversal of the system illustrated in FIG. 1, the interfitting members are formed by a boss 105 integral with the piston 103 and received with all-around clearance in a recess 106 of the cylinder 102. The boss 105 is here formed with a groove 111 which receives the inner turn 108 of a coil spring 120 whose outer turns 109, 110 of relatively large diameter bear radially outwardly upon the wall of the recess 106. The inner turn 108 projects radially outwardly from the groove 111 and is engageable with the left-hand outer turn 109 to entrain the latter to the left when the brake play exceeds a predetermined distance. When the brake is released, the resilient characteristics of the brake guarantee restoration of the position illustrated in FIG. 3 at the new rest position, thereby compensating for any increase in play resulting from wear of the brake lining. In this embodiment, the spring 120 is of circular cross-section.

The modification of FIG. 4 represents another variation in which the outer turns 209 and 210 of the spring are of relatively small diameter while the inner turn 208 is of relatively large diameter and bears radially outwardly upon the cylindrical wall of the recess 206 formed in the piston 203. The latter is in force-transmitting relationship with a brakeshoe as illustrated in FIGS. 1 and 3. The cylinder 202 is provided with an axially extending boss 205 with clearance in the recess 206 and with a peripheral groove 211 in which the outer turns 209 and 210 are reecived. When hydraulic fluid is fed to the chamber 212, the piston 203 is advanced to the left for normal brake operation and, when brake-linnig wear increases the brake play, the outer turn 210 engages the inner turn 208 with a force exceeding its frictional retardation and draws it along the wall of recess 206. Upon release of the brake pedal, the spring 220 reestablishes itself in the position illustrated in FIG. 4 and resiliently retains the piston 203 in its new rest position. In this embodiment, the spring 220 has a triangular cross-section.

It will be understood that the rectangular, triangular and circular cross-sections of the springs 20, 120 and 220 can be used in the three embodiments represented, that one or more additional turns can be provided upon each of the springs of these embodiments and that the springs of all three embodiments can be provided with outer turns of relatively small diameter or relatively large diameter while the inner turns have large or small diameters respectively, all within the concepts described above.

I claim:
1. In a fluid-operated brake assembly having a fluid-ceiving cylinder, a piston displaceable within said cylinder by fluid introduced under pressure thereto, at least one brake-shoe shiftable by said piston and a braking surface frictionally engageable by said brakeshoe upon its displacement by said piston, the improvement which comprises self-adjusting means within said cylinder for re-establishing a rest position of said piston to maintain a substantially constant brake play, said self-adjusting means comprising:

a pair of telescopingly interfitted members forming an all-around clearance therebetween and respectively connected with said piston and with said cylinder; and a spiral spring received in said clearance and having a relatively small-diameter turn engaging an inner of said members and a relatively large-diameter turn engaging the outer of said members, one of said turns frictionally engaging the respective one of said members under radial prestress but being shiftable therealong upon movement of said piston relatively to said cylinder through a distance exceeding said brake play.

2. The improvement as defined in claim 1 wherein the other of said members is provided with a peripheral groove open in the direction of said one of said members and receiving said other turn for axially fixing said other turn relatively to said other member.

3. The improvement as defined in claim 2 wherein said other turn extends radially outwardly from said groove for abutting engagement with said one of said turns upon said movement of said piston relatively to said cylinder through said distance.

4. The improvement as defined in claim 3 wherein said spring is composed of a spring wire having a rectangular cross-section.

5. The improvement as defined in claim 4 wherein the broad surfaces of said spring extend radially relatively to the axis of the spring.

6. The improvement as defined in claim 3 wherein said spring is composed of a spring wire of circular cross-section.

7. The improvement as defined in claim 3 wherein said spring is composed of a spring wire of triangular cross-section.

8. The improvement as defined in claim 3 wherein said one of said members is an axially extending boss formed in said cylinder and said one of said turns bears radially inwardly upon said boss, said other of said members being formed as a recess in said piston receiving said boss, said piston being formed peripherally along said recess with a groove receiving said large-diameter turn and entraining the latter in the direction of movement of said piston, said one of said turns being said small-diameter turn and frictionally engaging said boss ahead of said large-diameter turn in said direction.

9. The improvement as defined in claim 3 wherein said one of said members is a recess formed in said cylinder and is frictionally engaged by said large-diameter turn under radially outward pressure, said other of said members being formed as a boss on said piston received in said recess and having a peripheral groove receiving said small-diameter turn, said large-diameter turn being disposed ahead of said small-diameter turn in the direction of movement of said piston through said distance.

10. The improvement as defined in claim 3 wherein said spring has at least three turns.

References Cited

UNITED STATES PATENTS 3,085,663   4/1963   Jakeways _____ 188—196

DUANE A. REGER, *Primary Examiner.*

U.S. Cl. X.R.

188—73, 79.5